US009015517B2

(12) United States Patent
Okano et al.

(10) Patent No.: US 9,015,517 B2
(45) Date of Patent: Apr. 21, 2015

(54) INFORMATION PROCESSING APPARATUS AND TIME-OF-DAY CONTROL METHOD

(75) Inventors: Kenji Okano, Kawasaki (JP); Kenji Gotsubo, Kawasaki (JP); Tadashi Yamada, Kawasaki (JP); Hiromi Fukumura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 501 days.

(21) Appl. No.: 13/414,900

(22) Filed: Mar. 8, 2012

(65) Prior Publication Data

US 2012/0233487 A1 Sep. 13, 2012

(30) Foreign Application Priority Data

Mar. 11, 2011 (JP) ................. 2011-054044

(51) Int. Cl.
*G06F 1/04* (2006.01)
*G06F 1/14* (2006.01)

(52) U.S. Cl.
CPC ........................ *G06F 1/14* (2013.01)

(58) Field of Classification Search
USPC .......................................... 713/400, 500, 600
See application file for complete search history.

(56) References Cited

U.S. PATENT DOCUMENTS

| 8,370,675 B2 * | 2/2013 | Kagan ........................ 713/400 |
| 2004/0205368 A1 | 10/2004 | Lange-Pearson et al. |
| 2007/0061605 A1 * | 3/2007 | Engler et al. .................. 713/500 |
| 2008/0256501 A1 * | 10/2008 | Armstrong et al. ............... 716/7 |
| 2009/0007136 A1 | 1/2009 | Endou |

FOREIGN PATENT DOCUMENTS

| JP | 4-40552 | 2/1992 |
| JP | 2000-20158 A | 1/2000 |
| JP | 2004-318878 A | 11/2004 |
| JP | 2005-267321 A | 9/2005 |
| JP | 2007-80264 A | 3/2007 |
| WO | 2007/099624 A1 | 9/2007 |

OTHER PUBLICATIONS

Japanese Office Action mailed Oct. 7, 2014 for corresponding Japanese Application No. 2011-054044, with Partial English Translation, 5 pages.

* cited by examiner

*Primary Examiner* — Kim Huynh
*Assistant Examiner* — Paul J Yen
(74) *Attorney, Agent, or Firm* — Fujitsu Patent Center

(57) ABSTRACT

In an information processing apparatus, a control unit includes a first clock device for providing the time of day. A physical domain includes a second clock device, and implements a logical domain that functions as a virtual information processing apparatus. The control unit controls a first time-of-day difference between the time of day of the first clock device and that of the second clock device. The physical domain controls a second time-of-day difference between the time of day of the second clock device and that of the logical domain. In the information processing apparatus, the time of day on the logical domain is controlled based on the first and second time-of-day differences.

7 Claims, 14 Drawing Sheets

FIG. 5

| TIME-OF-DAY OFFSET TABLE | 124 |
|---|---|
| ID | OFFSET |
| Domain#0 | + 00:01:13 |
| Domain#1 | + 00:00:10 |
| Domain#2 | − 00:01:29 |
| Domain#3 | + 00:02:05 |

FIG. 12

| TOD DIFFERENCE TABLE | 125 |
|---|---|
| ID | DIFFERENCE |
| SB#0 | + 00:00:15 |
| SB#1 | − 00:00:06 |
| SB#2 | + 00:00:23 |

INFORMATION PROCESSING APPARATUS AND TIME-OF-DAY CONTROL METHOD

CROSS-REFERENCE TO RELATED APPLICATION

This application is based upon and claims the benefit of priority of the prior Japanese Patent Application No. 2011-054044, filed on Mar. 11, 2011, the entire contents of which are incorporated herein by reference.

FIELD

The embodiments discussed herein are related to an information processing apparatus and a time-of-day control method.

BACKGROUND

Currently, there has been used a virtualization technique for causing at least one virtual information processing apparatus (sometimes referred to as virtual machine(s) or logical domain(s)) to be implemented on a physical information processing apparatus. Such an information processing apparatus using the virtualization technique executes, for example, software (sometimes referred to as a hypervisor) for controlling logical domains. The hypervisor allocates resources, such as a CPU (Central Processing Unit) and a RAM (Random Access Memory), to the logical domains. On each logical domain, an operating system (OS) is executed. The OS on each logical domain manages the resources allocated by the hypervisor, and controls execution of application programs.

The OS on each logical domain sometimes gets clock access e.g. for acquiring the time of day or performing time-of-day setting. In doing this, it is also possible to convert the current time of day recognized by a logical domain to one which is different from the time of day by a clock device provided in the information processing apparatus (virtualize the clock device). For example, there has been proposed a time-of-day clock control method in which a time-of-day clock offset is held in an actual computer that implements a virtual computer, and a virtual time-of-day clock is realized on the virtual computer using the time of day by an actual time-of-day clock provided in the actual computer and the held time-of-day clock offset (see e.g. Japanese Laid-open Patent Publication No. 04-40552).

By the way, if the number of logical domains implemented on an information processing apparatus increases, this may undesirably increase the frequency of access to a clock device provided in the information processing apparatus. Therefore, the concentration of access causes problems of increased load on the clock device and congestion of a bus to which the clock device is connected, resulting in reduced response speed. On the other hand, even if the number of clock devices provided in the information processing apparatus is merely increased, this brings about a problem of how to ensure consistency in the time of day when a time of day deviation occurs between the clock devices.

SUMMARY

According to an aspect of the invention, there is provided an information processing apparatus, including a control unit including a first clock device for providing a time of day, and a plurality of physical domains each including a second clock device for providing a time of day and each configured to be capable of implementing at least one logical domain that functions as a virtual information processing apparatus, wherein the control unit controls a first time-of-day difference between the time of day on the second clock device of each physical domain and the time of day on the first clock device, wherein each physical domain manages a second time-of-day difference between a time of day on a logical domain implemented on the physical domain and the time of day on the second clock device of the physical domain, and wherein the time of day on the logical domain implemented on each of the plurality of physical domains is controlled based on the first time-of-day difference and the second time-of-day difference.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates an example of a time-of-day offset table;

FIG. 12 illustrates an example of a TOD difference table;

DESCRIPTION OF EMBODIMENTS

Figure 1:
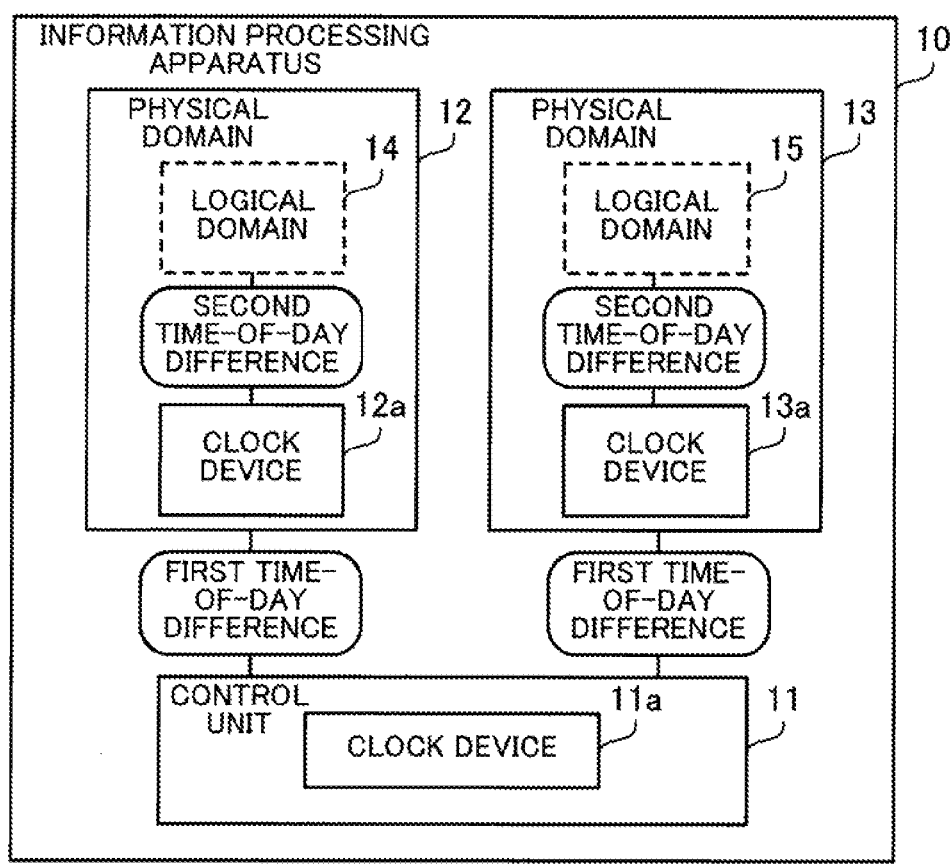
FIG. 1 illustrates an information processing apparatus according to a first embodiment.

Several embodiments will be described below with reference to the accompanying drawings, wherein like reference numerals refer to like elements throughout.

[a] First Embodiment

FIG. 1 illustrates an information processing apparatus according to a first embodiment. The information processing apparatus, denoted by reference numeral 10, according to the first embodiment includes a control unit 11, and physical domains 12 and 13.

The control unit 11 carries out control of the physical domains 12 and 13. The control unit 11 can be realized e.g. by causing a computer including a CPU and a RAM to execute a program for controlling the physical domains 12 and 13. The control unit 11 includes a clock device 11a. The clock device

11a is hardware for providing time of day used as a reference by the information processing apparatus 10.

The physical domains 12 and 13 are computers each including resources, such as a CPU and a RAM, and each implement one or more logical domains each of which functions as a virtual information processing apparatus. The physical domains 12 and 13 each allocate the resources of its own to the logical domain(s). In each of the physical domains 12 and 13, for example, a hypervisor for controlling the logical domains is executed. In the illustrated example in FIG. 1, the logical domain, denoted by reference numeral 14, is implemented in the physical domain 12, and the logical domain, denoted by reference numeral 15, is implemented in the physical domain 13. An OS is executed on each of the logical domains 14 and 15.

The physical domain 12 has a clock device 12a, and the physical domain 13 has a clock device 13a. The clock devices 12a and 13a are each hardware for providing the time of day. The clock device 12a is used for providing the time of day to the logical domain 14 implemented in the physical domain 12. The clock device 13a is used for providing the time of day to the logical domain 15 implemented in the physical domain 13. The clock devices 12a and 13a each may be a volatile clock device which loses the time of day upon stoppage of an associated one of the physical domains 12 and 13.

The control unit 11 controls differences in the time of day (first time-of-day difference) between the clock devices 12a and 13a, and the clock device 11a, respectively. The physical domain 12 (e.g. the hypervisor of the physical domain 12) controls a difference (second time-of-day difference) between the time of day recognized by the logical domain 14 and the time of day by the clock device 12a. Similarly, the physical domain 13 (e.g. the hypervisor of the physical domain 13) controls a difference (second time-of-day difference) between the time of day recognized by the logical domain 15 and the time of day by the clock device 13a. In the information processing apparatus 10, with reference to the time of day by the clock device 11a, the time of day is controlled on the logical domains 14 and 15 based on the first time-of-day difference and the second time-of-day difference, respectively.

For example, when the physical domain 12 is started up, the control unit 11 copies the time of day by the clock device 11a to that of the clock device 12a. The physical domain 12 provides the time of day obtained by adding the second time-of-day difference to the time of day on the clock device 12a to the logical domain 14. The second time-of-day difference sometimes changes according to a time-of-day setting command issued by the OS on the logical domain 14.

On the other hand, the time of day on the clock device 12a may be configured not to be corrected after the physical domain 12 has been started up. It can be envisaged that the control unit 11 manages the time-of-day discrepancy between the clock device 11a and the clock device 12a, caused after the physical domain 12 has been started up, without correcting the time of day on the clock device 12a. When the logical domain 14 is stopped, the control unit 11 may acquire information indicative of the second time-of-day difference from the physical domain 12 to thereby hold the total sum of the first time-of-day difference and the second time-of-day difference as the time-of-day difference on the logical domain 14. This makes it possible, when the logical domain 14 is started up again, to set the time of day obtained by adding the time-of-day difference held by the control unit 11 to the time of day by the clock device 11a at the time point, as an initialized time of day on the logical domain 14.

In the information processing apparatus 10, the physical domains 12 and 13 each implement the logical domain that functions as a virtual information processing apparatus. The control unit 11 manages the first time-of-day differences between the clock device 11a, and the clock devices 12a and 13a, respectively. The physical domains 12 and 13 each manage the second time-of-day difference between the time of day on the logical domain implemented in the associated physical domain and the time of day by the clock device of the associated physical domain. The information processing apparatus 10 manages the time of day on the logical domains 14 and 15 based on the first time-of-day differences and the second time-of-day differences.

This makes it possible to distribute access from the logical domains 14 and 15 between the clock devices 12a and 13a. As a result, it is possible to reduce the concentration of load on a specific clock device and the congestion of a bus, and even when the number of logical domains to be started is increased, it is possible to prevent the response speed from being reduced. Further, the control unit 11 controls the first time-of-day differences, and the physical domains 12 and 13 each control the second time-of-day difference, and hence even if the clock devices 12a and 13a are not continuously corrected in the time of day, it is possible to ensure consistency of the time of day. As a consequence, it is possible to reduce overhead of processing for ensuring time consistency. Further, it is easier to maintain accuracy of the time of day, compared with a case where the physical domains 12 and 13 carry out time-of-day control by software without using the clock devices 12a and 13a, whereby it is possible to reduce processing for maintaining accuracy e.g. in NTP (Network Time Protocol) communication.

[b] Second Embodiment

Figure 2:
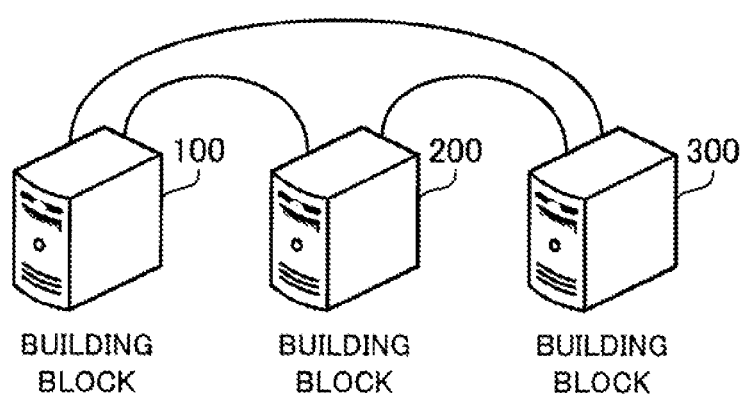
FIG. 2 illustrates an information processing system according to a second embodiment.

FIG. 2 illustrates an information processing system according to a second embodiment. The information processing system according to the second embodiment includes building blocks (BB) 100, 200, and 300. The building blocks 100, 200, and 300 each are a casing of a computer capable of implementing a logical domain that functions as a virtual information processing apparatus. The building blocks 100, 200, and 300 are connected by communication cables. For example, the building blocks 100, 200, and 300 are connected in an all-to-all manner. However, the building blocks 100, 200, and 300 may be connected via a communication device, such as a switch.

Figure 3:
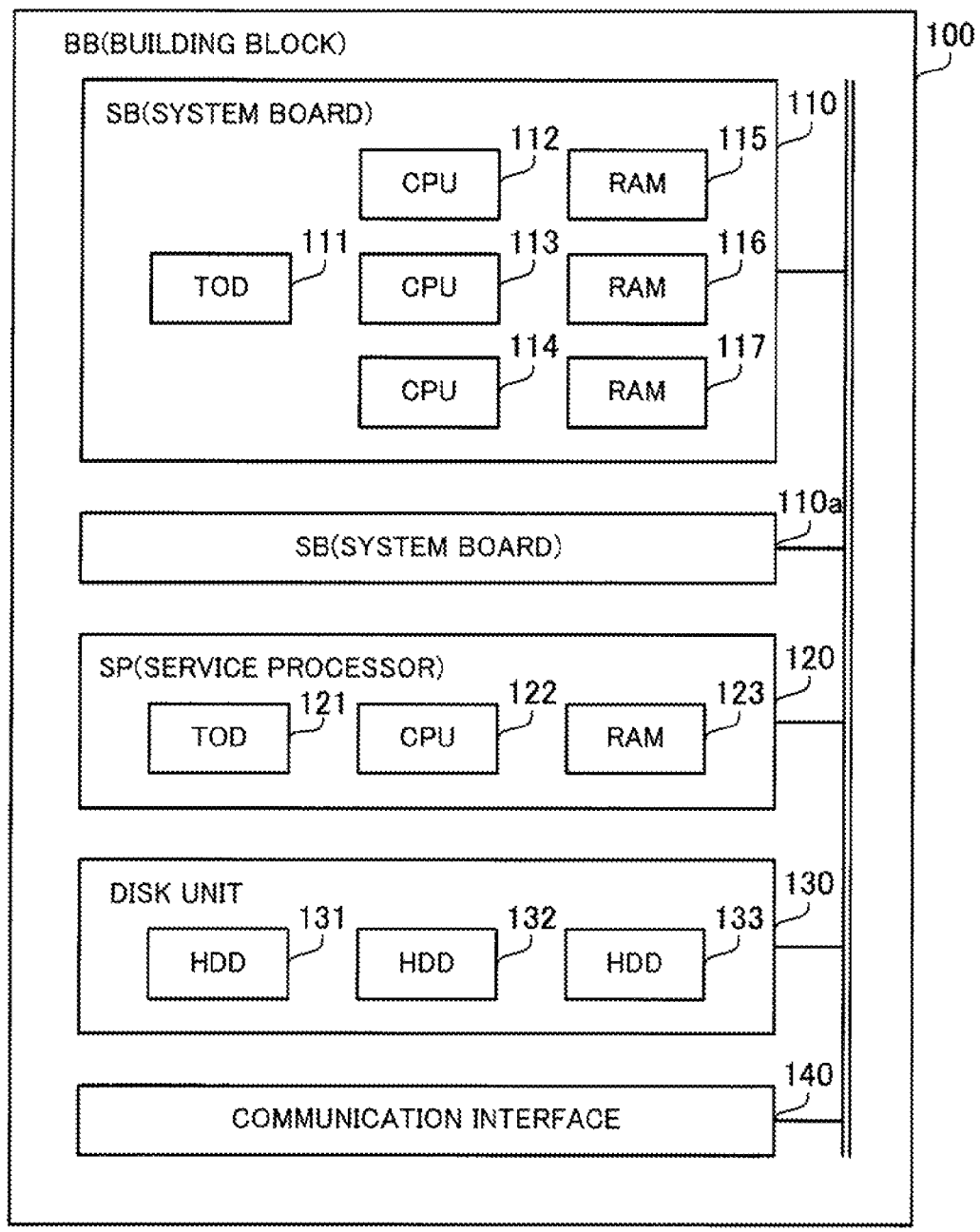
FIG. 3 is a block diagram of an example of the hardware configuration of the second embodiment.

FIG. 3 is a block diagram of an example of the hardware configuration of the second embodiment. The building block 100 includes system boards (SB) 110 and 110a, a service processor (SP) 120, a disk unit 130, and a communication interface 140. These units are, for example, connected to a bus within the building block 100. Note that the building blocks 200 and 300 are also realized by the same hardware configuration as that of the building block 100.

The system boards 110 and 110a each are a computer, as a collection of resources, which is used for implementing logical domains and a hypervisor that controls the logical domains. The system board 110 includes a TOD (time of day) clock 111, CPUs 112 to 114, and RAMs 115 to 117. The system board 110a also includes a TOD clock, CPUs and RAMs, similarly to the system board 110. However, the number of the system boards of the building block 100 may be one, or three or more.

The TOD clock 111 is hardware for providing the current time of day within the system board 110. However, the current time of day held by the TOD clock 111 is volatile, and the current time of day has its initial value set by the service processor 120 when the system board 110 is started up, and is lost when the system board 110 is shut down. The CPUs 112 to 114 are computing units that execute programs, such as the OS and the hypervisor. The RAMs 115 to 117 are volatile memories for temporarily storing at least part of programs and data. The hypervisor allocates the throughput of the CPUs 112 to 114 and the storage areas of the RAMs 115 to 117 to the logical domains.

The service processor 120 is a computer for controlling the system boards 110 and 110a. The service processor 120 includes a TOD clock 121, a CPU 122, and a RAM 123. The TOD clock 121 is hardware for providing the current time of day used as a reference by the entire building block 100. Electric power is supplied to the TOD clock 121 from a battery, so that the time of day held by the TOD clock 121 is a non-volatile time which is not lost even when the service processor 120 is stopped. The CPU 122 is a computing unit for executing programs for controlling the system boards 110 and 110a. The RAM 123 is a volatile memory for temporarily storing at least part of programs and data.

The disk unit 130 is a collection of nonvolatile storage devices that store programs and data used by the system boards 110 and 110a, and the service processor 120. The disk unit 130 includes HDDs (Hard Disk Drives) 131 to 133. The HDDs 131 to 133 each magnetically write and read data into and from an internal disk according to access from the system boards 110 and 110a, and the service processor 120. Note that other types of nonvolatile storage devices, such as flash memories, may be used in place of the HDDs 131 to 133.

The communication interface 140 is an interface having a communication port to which communication cables are connected. The communication interface 140 performs communication with the other building blocks (BB 200 and 300) via the connected communication cables. Between the building blocks BB 100, 200, and 300, there are established logical links for the system boards to communicate with each other and logical links for the service processors to communicate with each other. The logical links for the system boards and the logical links for the service processors may share the same physical communication cables or may use respective physical communication cables different from each other. In the latter case, at least two communication cables are used to connect between two building blocks.

Figure 4:
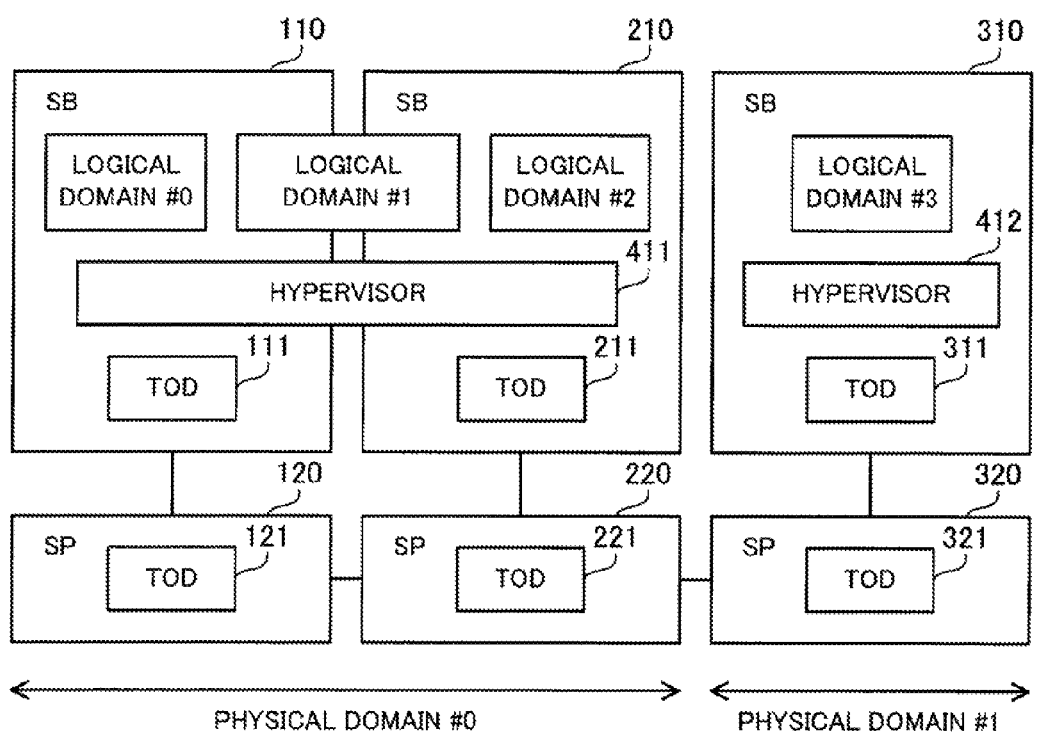
FIG. 4 is a block diagram of an example of the logical configuration of the information processing system.

FIG. 4 is a block diagram of an example of the logical configuration of the information processing system. In the illustrated example in FIG. 4, the system board 110 of the building block 100, a system board 210 of the building block 200, and a system board 310 of the building block 300 are used for implementing the logical domains. Although in the illustrated example in FIG. 4, the system boards of the building blocks which are different from each other are used, a plurality of system boards of the same building block may be used.

The plurality of system boards are partitioned into physical domains (sometimes referred to as PPARs: Physical PARtitions). A plurality of system boards belonging to the same physical domain are logically connected to each other and are recognized by software as a single resource collection, and hence it is also possible to create a logical domain such that the logical domain spans the plurality of system boards. On the other hand, system boards in respective different physical domains are logically disconnected, and hence it is impossible for software of one system board to recognize resources of another system board.

For example, the system boards 110 and 210 belong to a physical domain #0, and the system board 310 belongs to a physical domain #1. Logical domains #0 to #2 and a hypervisor 411 are realized in the physical domain #0. A logical domain #3 and a hypervisor 412 are realized in the physical domain #1.

The hypervisor 411 is arranged such that it spans the system boards 110 and 210, and manages the logical domains #0 to #2 within the physical domain #0. Hypervisors programs executed in the system boards 110 and 210, respectively, communicate and cooperate with each other, whereby the hypervisor 411 is realized. The hypervisor 411 arranges the logical domain #0 in the system board 110, the logical domain #1 such that it spans the system boards 110 and 210, and the logical domain #2 in the system board 210. The hypervisor 411 performs communication to thereby pass information indicative of the status of the logical domain #1 between the system boards 110 and 210, whereby the logical domain #1 is realized. Similarly, the hypervisor 412 is arranged in the system board 310, and manages the logical domain #3.

The service processor 120 of the building block 100, a service processor 220 of the building block 200, and a service processor 320 of the building block 300 perform time of day control in cooperation with each other. First, when the building blocks 100 to 300 are connected, a master service processor which performs the overall control of the plurality of service processors is selected from the service processors 120, 220, and 320. In the second embodiment, it is assumed that the service processor 120 is selected as the master service processor. The slave service processors (service processors 220 and 320) other than the master service processor each synchronize the time of day on a TOD clock (associated one of TOD clocks 221 and 321) thereof with the time of day on a TOD clock (TOD clock 121) of the master service processor.

Then, the service processor 120 controls the time of day on the TOD clock 111 of the system board 110 using the TOD clock 121. The service processor 220 controls the time of day on the TOD clock 211 of the system board 210 using the TOD clock 221. The service processor 320 controls the time of day on the TOD clock 311 of the system board 310 using the TOD clock 321. The hypervisor 411 controls the time of day to be provided to the logical domains #0 to #2 using the TOD clocks 111 and 211. The hypervisor 412 controls the time of day to be provided to the logical domain #3 using the TOD clock 311.

Note that there is a possibility that a time-of-day discrepancy is caused between the TOD clocks 121, 221, and 321, and the TOD clocks 111, 211, and 311 as the time elapses. Further, by issuing a time-of-day setting command from an OS, it is possible to differently set the time of day on each of the logical domains #0 to #3. That is, the information processing system according to the second embodiment can have three kinds of time of day: the time of day on each service processor, the time of day on each system board, and the time of day on each logical domain.

Further, the service processors 120, 220, and 320 correspond to an example of the control unit 11 according to the first embodiment. The TOD clocks 121, 221, and 321 correspond to an example of the clock device 11a. The system boards 110, 210, and 310 correspond to an example of the physical domains 12 and 13. The TOD clocks 111, 211, and 311 correspond to an example of the clock devices 12a and 13a. The logical domains #0 to #3 correspond to an example of the logical domains 14 and 15.

FIG. 5 illustrates an example of a time-of-day offset table. The service processor 120 as the master service processor holds the time-of-day offset table, denoted by reference numeral 124, as illustrated in FIG. 5. For example, the RAM 123 stores the time-of-day offset table 124. The time-of-day offset table 124 includes columns of an ID (identifier) and an offset. The ID is identification information for identifying the logical domains #0 to #3. The offset is a time-of-day offset indicative of a difference between the virtual time of day recognized by each of the logical domains #0 to #3 and the actual time.

When a logical domain is started up, a virtual time of day recognized by the started logical domain is calculated by applying a time-of-day offset indicated in the time-of-day offset table 124. For example, "ID=Domain #0" and "offset=+00:01:13" are registered in the time-of-day offset table 124. This indicates that the time of day on the logical domain #0 is one minute and thirteen seconds faster than the actual time. The time-of-day offset may be updated by issuing a time-of-day setting command from the OS on each logical domain. Further, the time-of-day offset on the logical domain which is started up for the first time is equal to zero.

Figure 6:
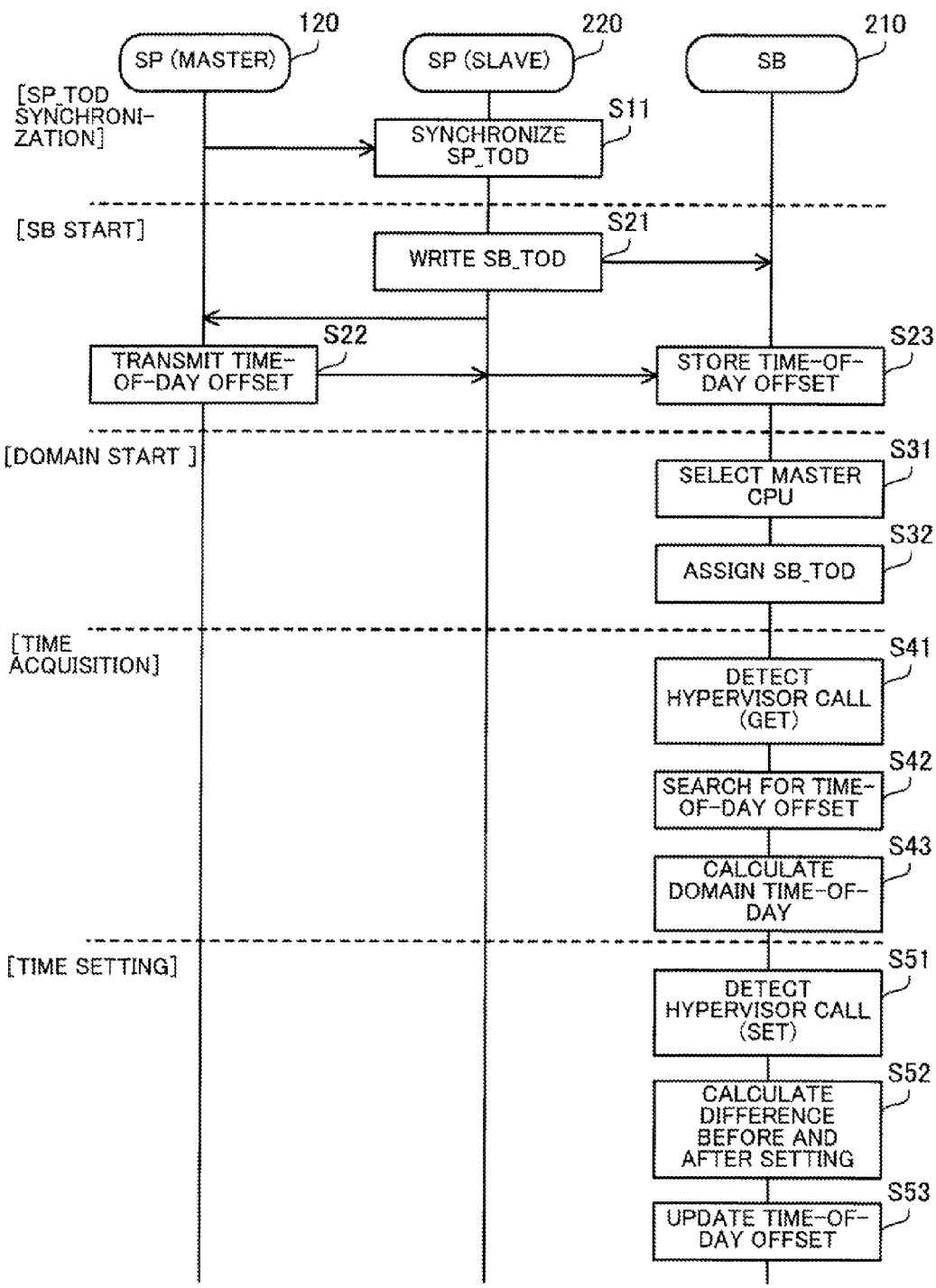
FIG. 6 is a sequence diagram of an example of time-of-day control according to the second embodiment.

FIG. 6 is a sequence diagram of an example of time-of-day control according to the second embodiment. Here, a description will be given mainly of the time-of-day control with respect to the logical domain #2 implemented on the system board 210. The same time-of-day control is carried out also with respect to the other logical domains.

[step S11] The service processor 220 as a slave service processor periodically synchronizes the time of day on the TOD clock 221 with the time of day on the TOD clock 121 of the service processor 120 as the master service processor. For example, the service processor 220 acquires the time of day from the service processor 120 through communication using NTP (Network Time Protocol), and writes the acquired time of day into the TOD clock 221. The service processor 320 also performs the time-of-day synchronization in the same manner as the service processor 220.

The service processors 120, 220, and 320 may have not only the hardware clocks of the TOD clocks 121, 221, and 321, but also respective software clocks. In that case, the time-of-day synchronization is carried out also between the hardware clocks and the software clocks. For example, in a case where the service provider 120 makes use of an external NTP server, as described hereinafter, whenever the software clock is updated through communication using NTP, the service processor 120 writes the time of day on the software clock into the TOD clock 121. In a case where the NTP server is not made use of, the service processor 120 copies the time of day on the TOD clock 121 to the software clock. On the other hand, the service processors 220 and 320 update both of the TOD clocks 221 and 321 and the respective software clocks by the above-mentioned time-of-day synchronization.

Next, a case is considered where the system board 210, of which the power has been off, is powered on to be started up.

[step S21] When the service processor 220 detects that the system board 210 within the same building block is being started up, the service processor 220 writes the time of day on the TOD clock 221 into the TOD clock 211 of the system board 210. For example, the service processor 220 writes a value of the TOD clock 221 into an FPGA (Field Programmable Gate Array) of the TOD clock 211. The TOD clock 211 starts counting the current time-of-day by using the written time of day as an initial value. Note that a time-of-day discrepancy may be caused between the TOD clock 211 and the TOD clock 221 as the time elapses. However, the time of day on the TOD clock 211 is not corrected until the system board 210 is started up next time.

[step S22] The service processor 220 notifies the service processor 120 that the system board 210 is being started up. The service processor 120 transmits the time-of-day offset having registered in the time-of-day offset table 124 to the service processor 220.

[step S23] The service processor 220 transfers the time-of-day offset received from the service processor 120 to the hypervisor 411 that is being executed in the system board 210. The hypervisor 411 stores the time-of-day offset received from the service processor 220 in the associated RAM. Note that when the system board 110 is started up, the service processor 120 performs the time-of-day setting and the transmission of the time-of-day offset by itself.

Next, a case is considered where the stopped logical domain #2 is started on the physical domain #0.

[step S31] The hypervisor 411 assigns one or more CPUs used for implementing the logical domain #2 out of the CPUs of the system boards 110 and 210 such that load on the system boards is not unbalanced. Then, the hypervisor 411 selects one master CPU that performs centralized control of processes by the CPUs (e.g. executes the OS) out of the CPUs assigned to the logical domain #2. Here, it is assumed that a CPU of the system board 210 is selected as the master CPU.

[step S32] The hypervisor 411 assigns a TOD clock which belongs to the same system board to which the master CPU selected in the step S31 belongs, to the logical domain #2. Since the CPU of the system board 210 is selected as the master CPU, the TOD clock 211 is assigned to the logical domain #2. From then on, the hypervisor 411 executes the time-of-day processing with respect to the logical domain #2 using the TOD clock 211 assigned to the logical domain #2.

Next, a case is considered where the OS on the logical domain #2 acquires the time of day.

[step S41] The hypervisor 411 detects that the OS on the logical domain #2 has issued a hypervisor call (tod_get) for acquiring the time of day, on the system board 210.

[step S42] The hypervisor 411 searches the time-of-day offsets stored in the RAM for a time-of-day offset associated with the logical domain #2.

[step S43] The hypervisor 411 access the TOD clock 211 assigned to the logical domain #2 to read out the time of day on the TOD clock 211. Then, the hypervisor 411 calculates the virtual time of day on the logical domain #2 by adding the time-of-day offset associated with the logical domain #2 to the time of day on the TOD clock 211, and notifies the OS on the logical domain #2, which is an issuer of the hypervisor call, of the calculated time of day. Note that the TOD clock 221 of the service processor 220 is not accessed in the acquisition of the time of day.

Next, a case is considered where the OS on the logical domain #2 changes the time of day.

[step S51] The hypervisor 411 detects that the OS on the logical domain #2 has issued a hypervisor call (tod_set) for setting the time of day on the system board 210. Note that tod_set is issued e.g. when an application program executes a time-of-day setting command on the logical domain #2.

[step S52] The hypervisor 411 calculates the virtual time of day on the logical domain #2 before changing the time of day by the same method as that used in the steps S42 and S43. Then, the hypervisor 411 calculates a difference between the setting time of day designated in the hypervisor call and the time of day before the change.

[step S53] If the calculated difference in the time of day is not less than one second, the hypervisor 411 adds the calculated difference to the time-of-day offset for the logical domain #2 to thereby update the time-of-day offset stored in the RAM. Then, the hypervisor 411 notifies the OS on the logical domain #2, which is the issuer of the hypervisor call, of the completion of the time-of-day setting. Note that the time of day on each of the TOD clock 211 of the system board 210 and the TOD clock 221 of the service processor 220 is not corrected when setting the time of day.

Figure 7:
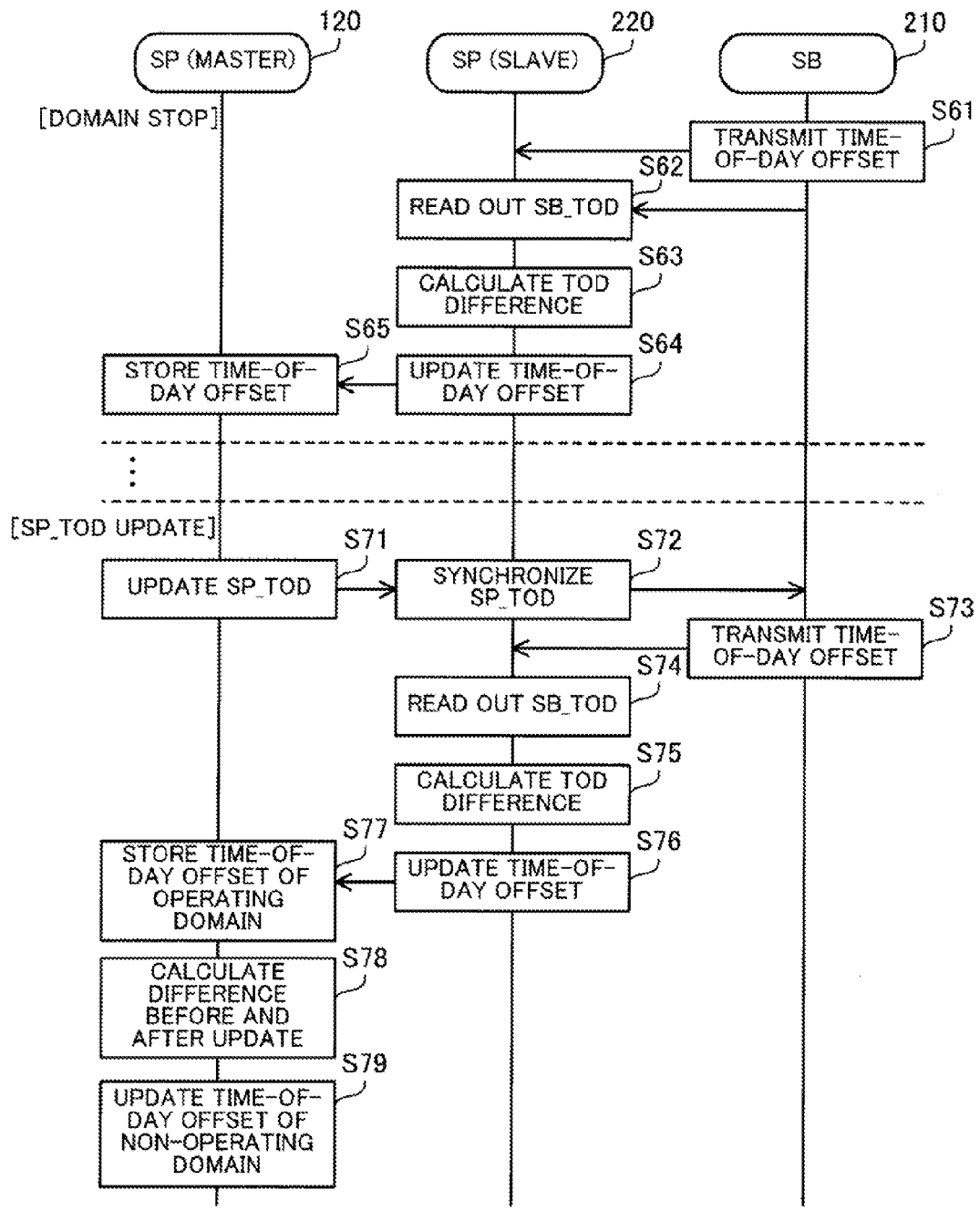
FIG. 7 is a sequence diagram (continuation of FIG. 6) of the example of the time-of-day control according to the second embodiment.

FIG. 7 is a sequence diagram (continuation of FIG. 6) of the example of the time-of-day control according to the second embodiment.

Here, a case is considered where the logical domain #2 being executed on the system board 210 is stopped.

[step S61] The hypervisor 411 detects that the logical domain #2 is stopped e.g. due to shutdown of the OS on the system board 210. Then, the hypervisor 411 transmits the latest time-of-day offset for the logical domain #2 stored in the RAM to the service processor 220.

[step S62] The service processor 220 reads out the time of day from the TOD clock 211 of the system board 210.

[step S63] The service processor 220 reads out the time of day from the TOD clock 221. Then, the service processor 220 calculates a difference in the time of day between the TOD clock 211 and the TOD clock 221. Note that the control is performed such that an interrupt dose not occur between the readout of the time of day on the TOD clock 211 and the readout of that of the TOD clock 221.

[step S64] The service processor 220 adds the TOD difference calculated in the step S63 to the time-of-day offset received from the system board 210 to thereby update the time-of-day offset. Then, the service processor 220 transmits the updated time-of-day offset to the service processor 120.

[step S65] The service processor 120 registers the time-of-day offset received from the service processor 220 in the time-of-day offset table 124 in association with the logical domain #2. Note that when the logical domain being executed on the system board 110 is stopped, the service processor 120 also executes the processes corresponding to the steps S62 to S64.

Next, a case is considered where the time of day on the TOD clock 121 of the service processor 120 is updated. Here, it is assumed that the system board 310 is powered off.

[step S71] The service processor 120 acquires the current time of day from the NTP server through communication using NTP, and writes the acquired time of day into the TOD clock 121.

[step S72] The service processor 220 synchronizes the time of day on the TOD clock 221 with the TOD clock 121 of the service processor 120. Then, the service processor 220 notifies the hypervisor 411 of occurrence of the update of the time of day. Note that the service processor 320 also updates the time of day on the TOD clock 321 similarly to the service processor 220. Further, the service processor 120 notifies the hypervisor 411 of occurrence of the update of the time of day, similarly to the service processor 220.

[step S73] The hypervisor 411 transmits the time-of-day offset with respect to the logical domain #2 to which the TOD clock 211 of the system board 210 is assigned, to the service processor 220. The hypervisor 411 transmits the time-of-day offset with respect to the logical domain to which the TOD clock 111 of the system board 110 is assigned, to the service processor 120, similarly to the case of the system board 220.

[step S74] The service processor 220 reads out the time of day from the TOD clock 211 of the system board 210.

[step S75] The service processor 220 reads out the time of day on which the update carried out through the communication using NTP has been reflected, from the TOD clock 221. Then, the service processor 220 calculates a difference in the time of day between the TOD clock 211 and the TOD clock 221.

[step S76] The service processor 220 adds the TOD difference calculated in the step S75 to the time-of-day offset received from the system board 210 to thereby update the time-of-day offset. Then, the service processor 220 transmits the updated time-of-day offset to the service processor 120.

[step S77] The service processor 120 registers the time-of-day offset received from the service processor 220 in the time-of-day offset table 124 in association with the logical domain #2. The processes corresponding to the steps S74 to S76 are executed by the service processor 120, and the time-of-day offset with respect to the logical domain to which the TOD clock 111 is assigned is updated.

[step S78] The service processor 120 calculates a difference in the time of day before and after the update carried out through the communication using NTP.

[step S79] The service processor 120 reflects the update of the time of day carried out through the communication using NTP on the time-of-day offset (the time-of-day offset on the logical domain which is not in operation) which has not been updated in the step S77, out of the time-of-day offsets registered in the time-of-day offset table 124. For example, the difference calculated in the step S78 is subtracted from the current time-of-day offset.

Figure 8:
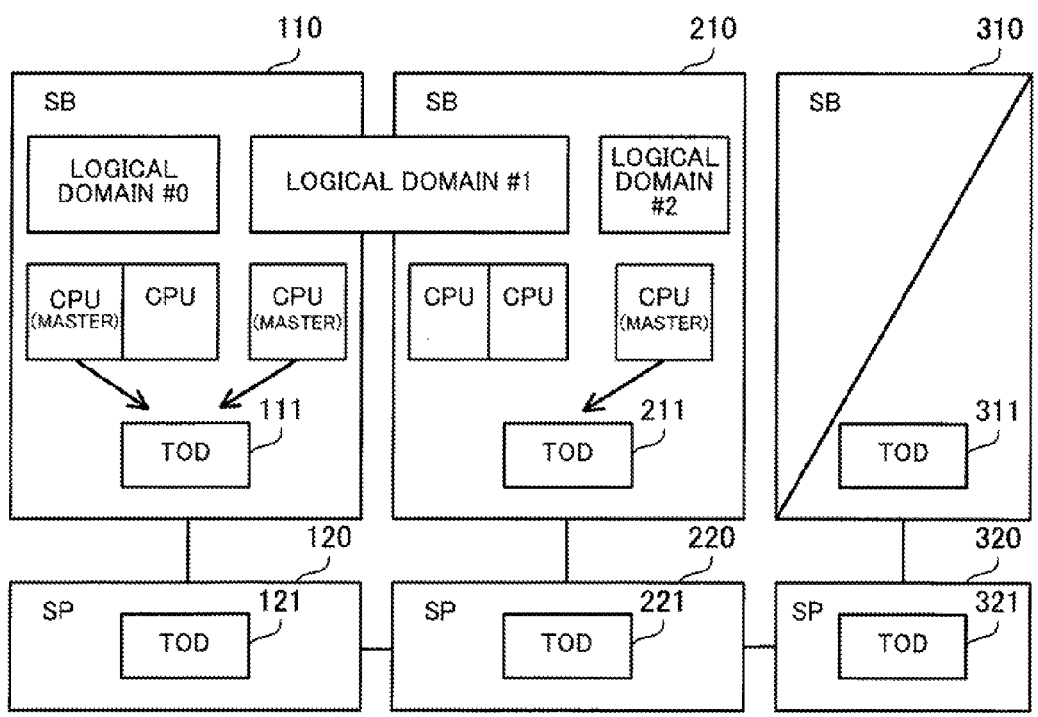
FIG. 8 illustrates an example of assignment of TOD clocks to logical domains.

FIG. 8 illustrates an example of assignment of the TOD clocks to the logical domains. In the illustrated example in FIG. 8, two CPUs of the system board 110 are assigned to the logical domain #0, and one of the assigned CPUs is selected as a master CPU. The remaining CPU of the system board 110 and two CPUs of the system board 210 are assigned to the logical domain #1, and the CPU of the system board 110 is selected as a master CPU. The remaining CPU of the system board 210 is assigned to the logical domain #2, and is selected as a master CPU.

In this case, the TOD clock 111 is assigned to the logical domains #0 and #1. When the OS on each of the logical domains #0 and #1 issues a hypervisor call for acquiring or setting the time of day, the hypervisor 411 performs the time-of-day processing using the time of day on the TOD clock 111. On the other hand, the TOD clock 211 is assigned to the logical domain #2. When the OS on the logical domains #2 issues a hypervisor call for acquiring or setting the time of day, the hypervisor 411 performs the time-of-day processing using the time of day on the TOD clock 211.

Figure 9:
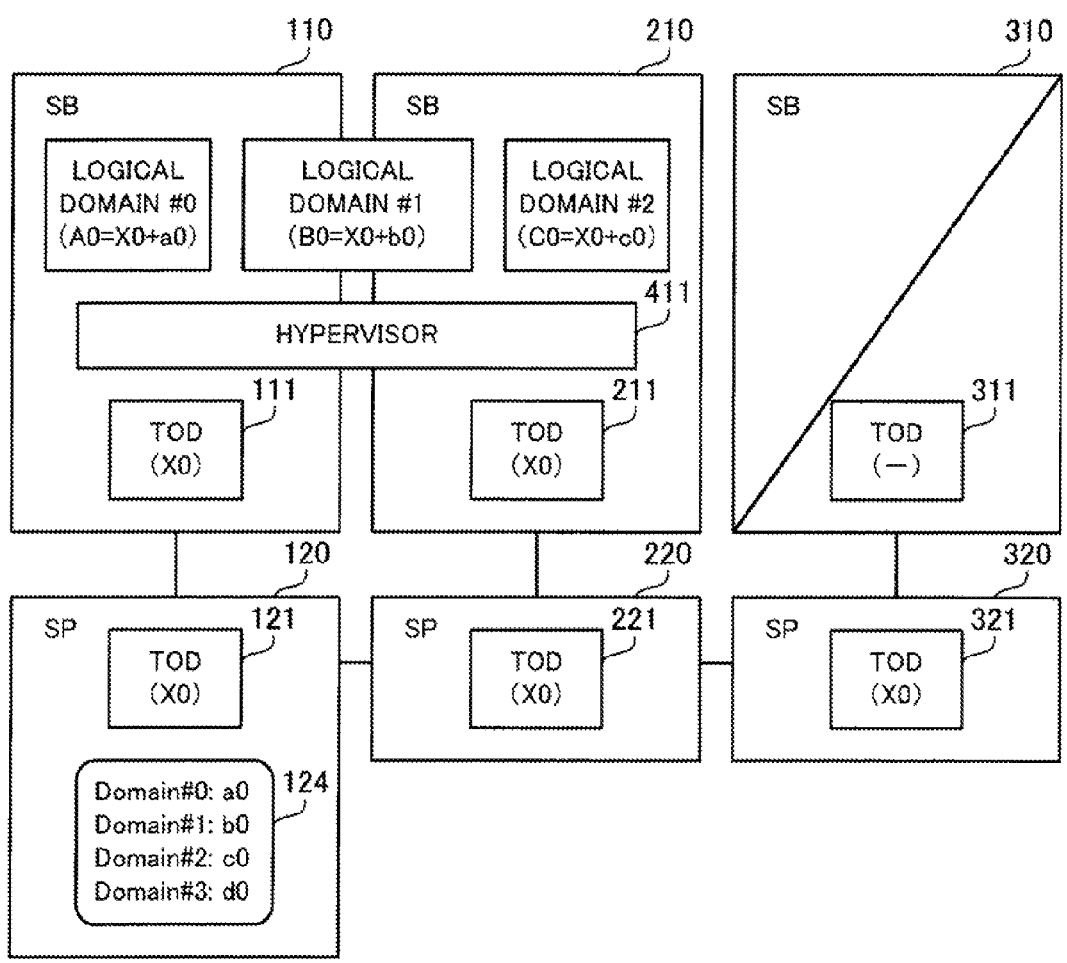
FIG. 9 illustrates a first example of a time-of-day setting status.

FIG. 9 illustrates a first example of the time-of-day setting status. In the illustrated example in FIG. 9, a case is considered where the system board 110 and the system board 210 are started up at the same time. In the time-of-day offset table 124 held by the service processor 120, the offset for the logical domain #0=a0, the offset for the logical domain #1=b0, the offset for the logical domain #2=c0, and the offset for the logical domain #3=d0 have been registered. Further, the current time of day indicated by the TOD clocks 121, 221, and 321 is X0.

In this case, the time of day X0 of the TOD clock 121 is set to the TOD clock 111, and the time of day X0 of the TOD clock 221 is set to the TOD clock 211. Further, the time-of-day offsets registered in the time-of-day offset table 124 are transmitted from the service processor 120 to the hypervisor 411. The hypervisor 411 calculates a time of day A0 on the logical domain #0 by adding the time-of-day offset a0 to the time of day X0 of the TOD clock 111. Similarly, the hypervisor 411 calculates a time of day B0 on the logical domain #1 by adding the time-of-day offset b0 to the time of day X0 of the TOD clock 111. The hypervisor 411 calculates a time of day C0 on the logical domain #2 by adding the time-of-day offset c0 to the time of day X0 of the TOD clock 211.

Figure 10:
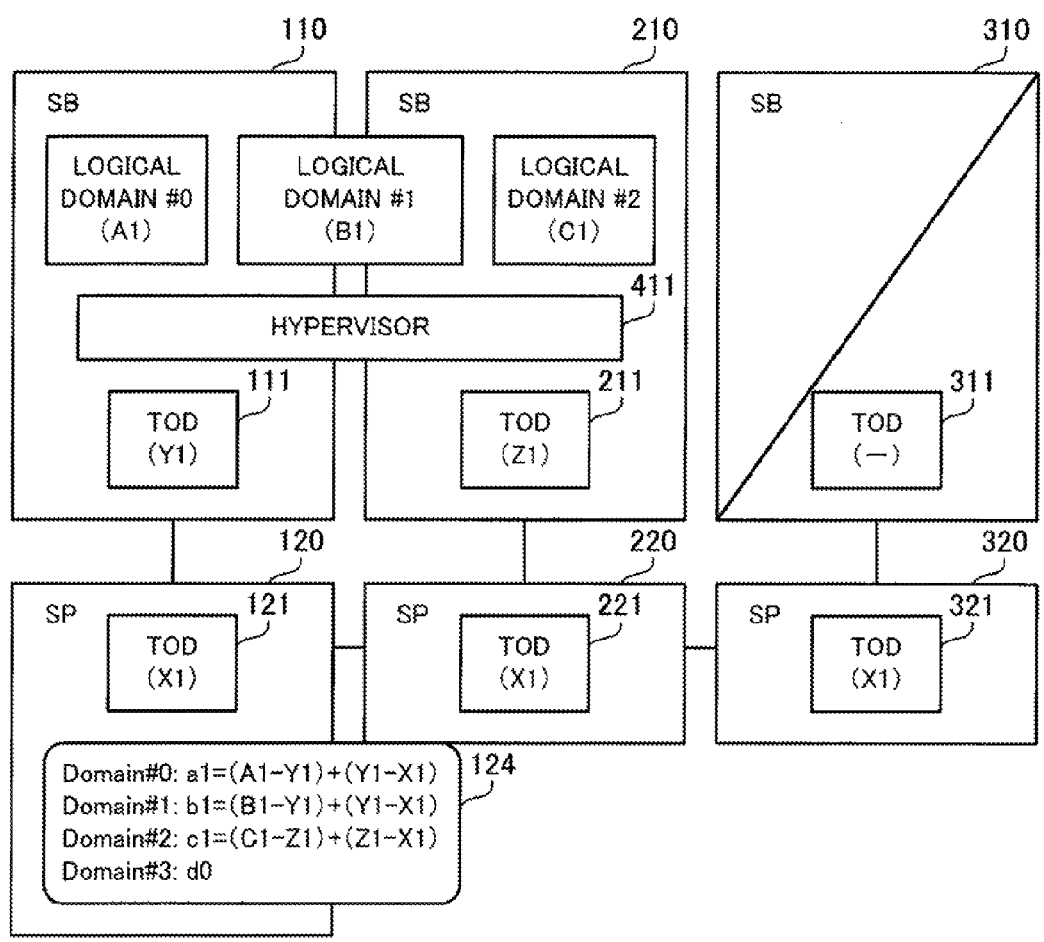
FIG. 10 illustrates a second example of the time-of-day setting status.

FIG. 10 illustrates a second example of the time-of-day setting status. As mentioned above, as the time elapses after the start of the system boards 110 and 210, a time-of-day discrepancy may be caused between the TOD clocks 121, 221, and 321, and the TOD clocks 111 and 211. In the illustrated example in FIG. 10, the time of day on the TOD clocks 121, 221, and 321 is represented by X1, the time of day on the TOD clock 111 is represented by Y1, and the time of day on the TOD clock 211 is represented by Z1.

In stopping the logical domains #0 to #2, the hypervisor 411 transmits a time-of-day offset A1−Y1 as a difference between the time of day A1 on the logical domain #0 and the time of day Y1 of the TOD clock 111 to the service processor 120 which belongs to the same building block that the TOD clock 111 belongs to. The hypervisor 411 transmits a time-of-day offset B1−Y1 as a difference between the time of day B1 on the logical domain #1 and the time of day Y1 of the TOD clock 111 to the service processor 120. Further, the hypervisor 411 transmits a time-of-day offset C1−Z1 as a difference between the time of day C1 on the logical domain #2 and the time of day Z1 of the TOD clock 211 to the service processor 220 which belongs to the same building block that the TOD clock 211 belongs to.

The service processor 120 adds the difference Y1−X1 between the time of day Y1 of the TOD clock 111 and the time of day X1 of the TOD clock 121 to the time-of-day offsets received from the system board 110 to thereby calculate time-of-day offsets a1 and b1, respectively. The service processor 220 adds the difference Z1−X1 between the time of day Z1 of the TOD clock 211 and the time of day X1 of the TOD clock 221 to the time-of-day offset received from the system board 210 to thereby calculate a time-of-day offset c1. The service processor 120 registers the time-of-day offsets a1, b1, and c1 in the time-of-day offset table 124.

Figure 11:
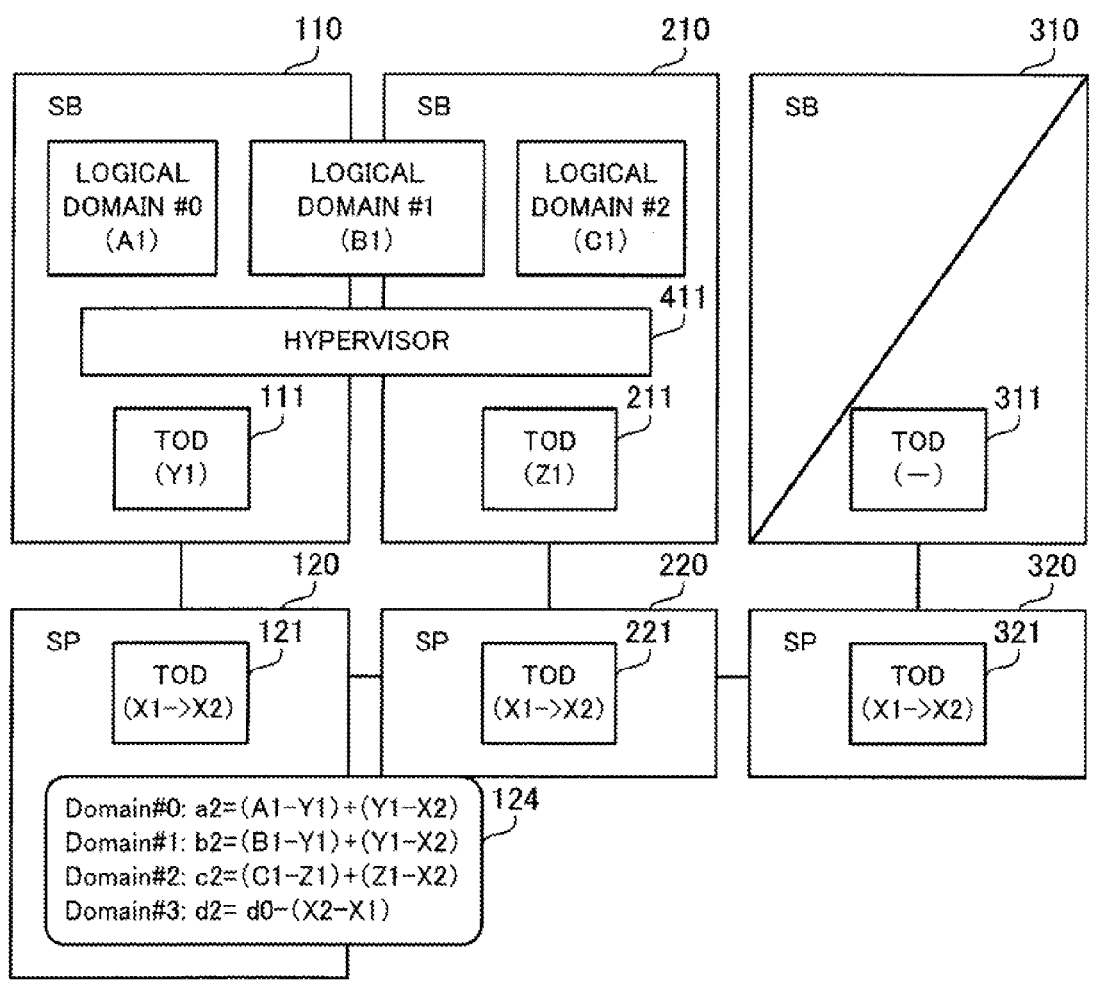
FIG. 11 illustrates a third example of the time-of-day setting status.

FIG. 11 illustrates a third example of the time-of-day setting status. In the illustrated example in FIG. 11, a case is considered where the time of day on the TOD clock 121 is changed from X1 to X2. Further, in this case, it is assumed that the system board 310 is in a down state, and the hypervisor 412 and the logical domain #3 are not in operation.

When the time of day on the TOD clock 121 is changed to X2, the time of day on the TOD clocks 221 and 321 is also changed to X2 by synchronization. The service processors 120 and 220 notify the hypervisor 411 of the change in the time of day. The hypervisor 411 transmits the time-of-day offset A1−Y1 on the logical domain #0 and the time-of-day offset B1−Y1 on the logical domain #1 to the service processor 120. The hypervisor 411 further transmits the time-of-day offset C1−Z1 on the logical domain #2 to the service processor 220.

The service processor 120 adds the difference Y1−X2 in the time of day between the TOD clock 111 and the TOD clock 121 to time-of-day offsets received from the system board 110 to thereby calculate time-of-day offsets a2 and b2. The service processor 220 adds the difference Z1−X2 in the time of day between the TOD clock 211 and the TOD clock 221 to a time-of-day offset received from the system board 210 to thereby calculate a time-of-day offset c2. The service processor 120 registers the time-of-day offsets a2, b2, and c2 in the time-of-day offset table 124.

Further, the service processor 120 calculates the difference X2−X1 in the time of day on the TOD clock 121 before and after the change. Then, the service processor 120 subtracts the difference X2−X1 from the time-of-day offset d0 on the logical domain #3, which is not in operation, registered in the time-of-day offset table 124 to thereby update the time-of-day offset to d2.

In the above description, the time-of-day offset table 124 held by the service processor 120 is updated when each logical domain is stopped, and when the time of day on the TOD clock 121 of the service processor 120 is changed. However, the time-of-day offset table 124 may be updated in timing other than the above, in preparation for a case where the hypervisors 411 and 412 are abnormally terminated. For example, the time-of-day offset table 124 may be periodically updated by causing the hypervisors 411 and 412 to output the time-of-day offsets on the respective logical domains periodically (e.g. whenever one hour elapses). Further, the time-of-day offset table 124 may be updated when the time-of-day offset is changed by execution of a hypervisor call for setting the time of day.

With the information processing system according to the second embodiment, it is possible to distribute the clock access when the logical domains #0 to #3 issue hypervisor calls between the TOD clocks 111, 211, and 311. This makes it possible to reduce concentration of load on a specific TOD or congestion of a bus, and even when the number of logical domains to be started is increased, it is possible to prevent the response speed from being reduced. Further, the service processors 120, 220, and 320 manage time-of-day discrepancies between the TOD clocks, and the hypervisors 411 and 412 manage time-of-day differences between the TOD clocks and the logical domains in a dispersed manner, and hence it is possible to ensure consistency in the time of day without continuously correcting the TOD clocks 111, 211, and 311 in respect of the time of day after the start of the system boards 110, 210, and 310. This makes it possible to reduce overhead processing for ensuring the consistency in the time of day.

[c] Third Embodiment

Next, a description will be given of a third embodiment. The following description is mainly given of difference points from the second embodiment, and description of points similar to those of the second embodiment is omitted. In an information processing system according to the third embodiment, a case is considered where during the operation of a logical domain, the TOD assigned to the operating logical domain is changed. The information processing system according to the third embodiment is realized by using the system configuration illustrated in FIG. 2 and the hardware configuration illustrated in FIG. 3, similarly to the information processing system according to the second embodiment. Hereinafter, the third embodiment will be described using the same reference numerals as those in FIGS. 2 to 4.

FIG. 12 illustrates an example of a TOD difference table. The TOD difference table, denoted by reference numeral 125, illustrated in FIG. 12 is held by the service processor 120 as the master service processor. For example, the RAM 123 stores the TOD difference table 125. The TOD difference table 125 includes columns of an ID and a difference. The ID is identification information for identifying the system boards 110, 210, and 310. The difference is a difference in the time of day (TOD difference) between a TOD clock (TOD clock 111, 211, or 311) of each system board, and a TOD clock (TOD clock 121, 221, or 321) of each service processor.

The TOD difference registered in the TOD difference table 125 is periodically (e.g. whenever one hour elapses) updated. For example, information of ID=SB #0 and the difference=+ 00:00:15 is registered in the TOD difference table 125. This indicates that the time of day on the TOD clock 111 of the system board 110 is fifteen seconds faster than the time of day on the TOD clock 121 of the service processor 120. Note that the TOD difference with respect to the system board which is in a down state is zero.

Figure 13:
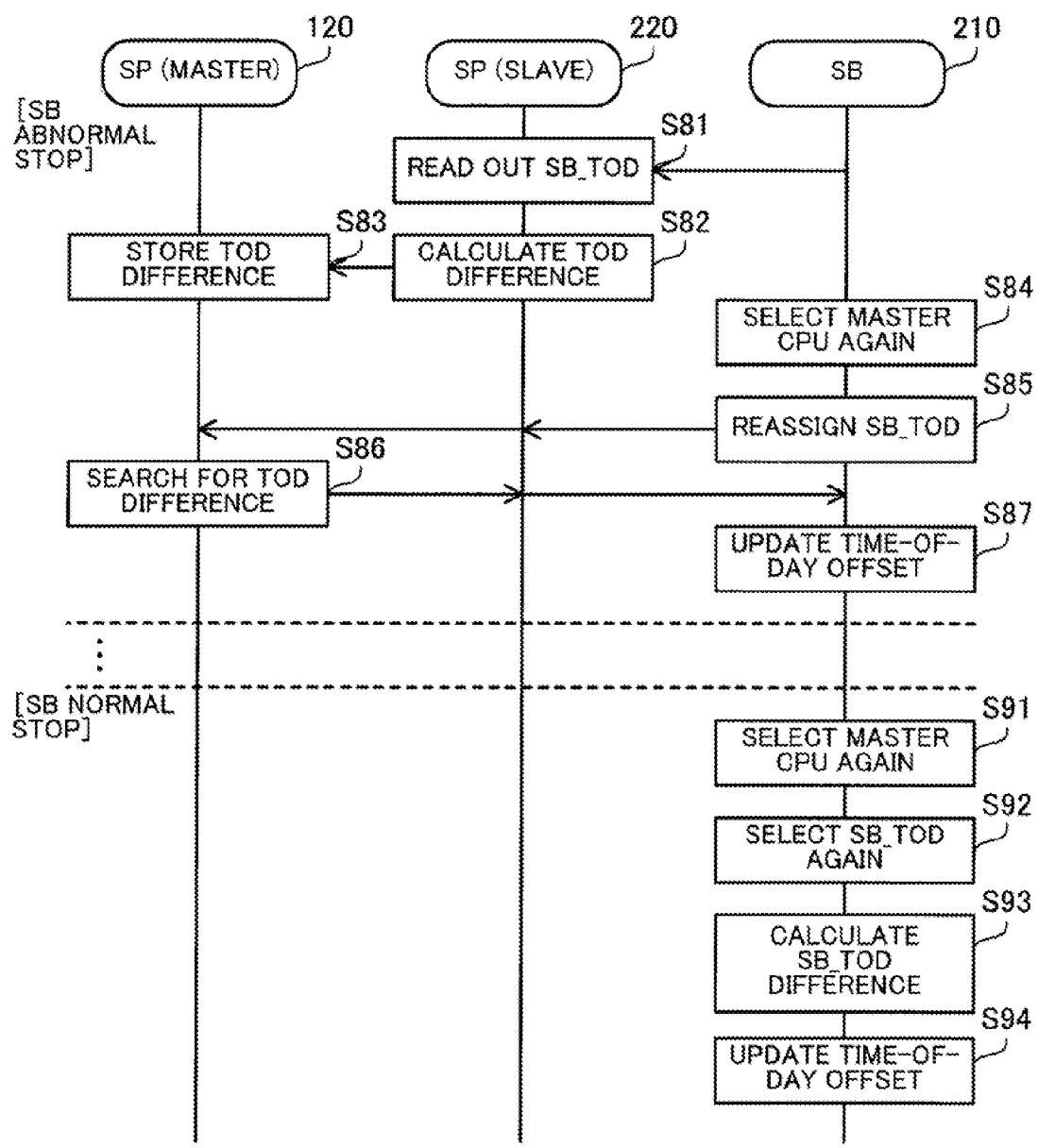
FIG. 13 is a sequence diagram of an example of time-of-day control according to a third embodiment.

FIG. 13 is a sequence diagram of an example of time-of-day control according to the third embodiment. Here, a case is considered where the TOD clock assigned to the logical domains #0 and #1 is changed from TOD clock 111 to TOD clock 211. A TOD clock is changed e.g. when the system board 110 is abnormally terminated due to a failure, and in a case where the system board 110 is normally stopped by a user's operation.

[step S81] The service processor 220 reads out the time of day from the TOD clock 211 of the system board 210.

[step S82] The service processor 220 reads out the time of day from the TOD clock 221. Then, the service processor 220 calculates a TOD difference between the TOD clock 211 and the TOD clock 221, and transmits the calculated TOD difference to the service processor 120.

[step S83] The service processor 120 registers the TOD difference received from the service processor 220 in the TOD difference table 125 in association with the system board 210. Note that when registering the TOD difference with respect to the system board 110 in the TOD difference table 125, the service processor 120 executes the same processes as the steps S81 and S82. The above-mentioned processes in the steps S81 to S83 are periodically executed.

[step S84] The hypervisor 411 detects that the system board 110 has been abnormally stopped on the system board 210. For example, the program being executed on the system board 210 detects that a response is not sent from the program being executed on the system board 110. Then, the hypervisor 411 reassigns CPUs to be used for implementing the logical domains #0 and #1, out of the CPUs of the system board 210. Then, the hypervisor 411 selects a master CPU again from the assigned CPUs.

[step S85] The hypervisor 411 reassigns the TOD clock 211 of the system board 210 to the logical domains #0 and #1. Further, the hypervisor 411 notifies the service processor 220 of the change from the TOD clock 111 to the TOD clock 211. The service processor 220 notifies the service processor 120 of the change of the TOD clock.

[step S86] The service processor 120 searches the TOD difference table 125 for a TOD difference of the TOD clock 111 before the change (TOD difference in the system board 110) and a TOD difference of the TOD clock 211 after the change (TOD difference in the system board 210). Then, a time-of-day discrepancy between the TOD clock 111 and the TOD clock 211 is calculated by subtracting the former TOD difference from the latter TOD difference, and transmits the calculated time-of-day discrepancy to the service processor 220. The service processor 220 transmits the time-of-day discrepancy to the hypervisor 411.

[step S87] The hypervisor 411 adds the time-of-day discrepancy acquired from the service processor 220 to each of the time-of-day offsets for the logical domains #0 and #1 to which the assignment of the TOD clock is changed, out of the time-of-day offsets held in the RAM. From then on, the hypervisor 411 calculates the time of day to be provided to the logical domains #0 and #1 using the time of day on the TOD clock 211 and the updated time-of-day offsets.

Next, a case is considered where the system board 110 is normally stopped by receiving a user's operation. Also in the normal stoppage, it is possible to change the TOD to be assigned to the logical domains #0 and #1 following the same procedure as in the above-described abnormal stoppage. However, in the normal stoppage, there is a grace period before the system board 110 is stopped, and hence it is possible to change the TOD clock without referring to the TOD difference table 125.

[step S91] The hypervisor 411 detects that the system board 110 is about to be stopped. Then, the hypervisor 411 reassigns CPUs used for implementing the logical domains #0 and #1, out of the CPUs of the system board 210. Then, the hypervisor 411 selects a master CPU from the assigned CPUs again.

[step S92] The hypervisor 411 reassigns the TOD clock 211 of the system board 210 to the logical domains #0 and #1.

[step S93] The hypervisor 411 reads out the time of day from the TOD clock 111 before the stoppage of the system board 110 is completed. The hypervisor 411 further reads out the time of day from the TOD clock 211. Then, the hypervisor 411 calculates a time-of-day discrepancy between the TOD clock 111 and the TOD clock 211 by subtracting the time of day on the TOD clock 111 from that of the TOD clock 211.

[step S94] The hypervisor 411 adds the calculated time-of-day discrepancy to each of the time-of-day offsets for the logical domains #0 and #1, to which the assignment of the TOD is changed out of the time-of-day offsets held in the RAM. From then on, the hypervisor 411 calculates the time of day to be provided to the logical domains #0 and #1 using the time of day on the TOD clock 211 and the updated time-of-day offsets.

Figure 14:
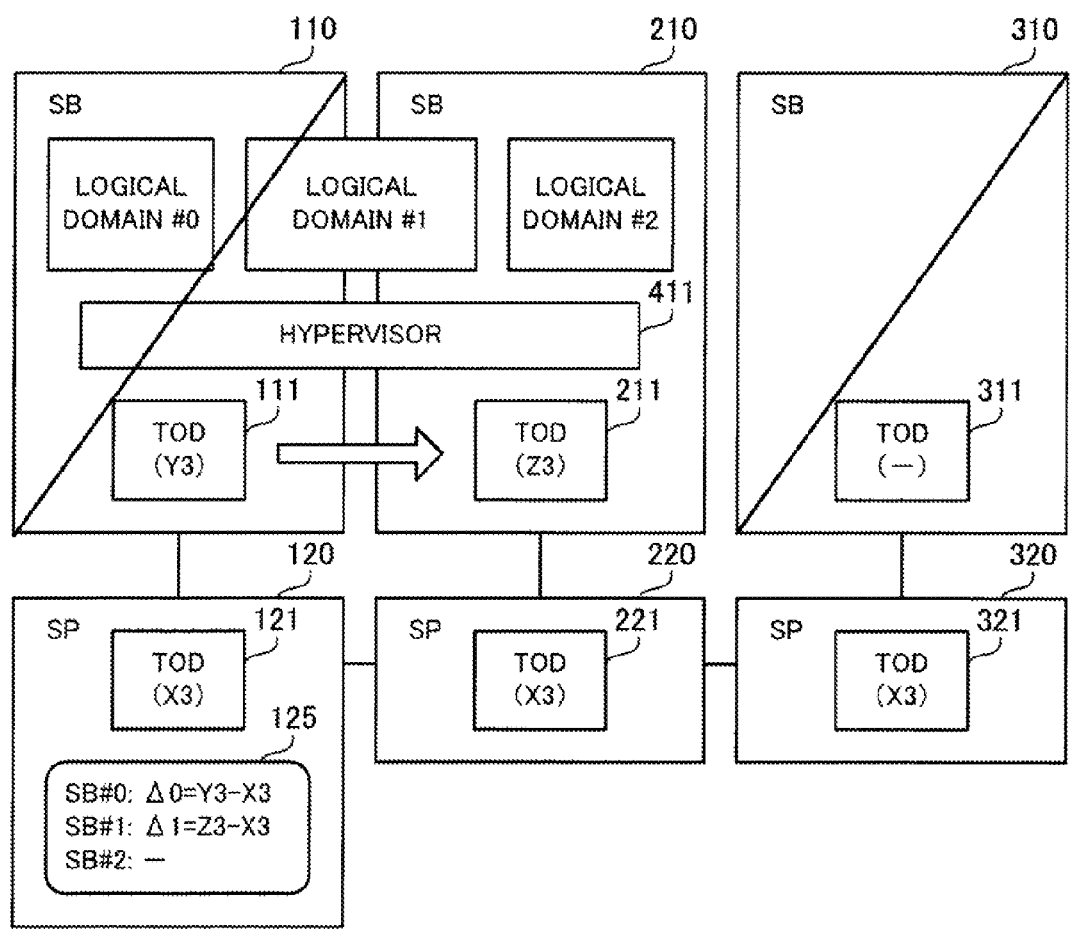
FIG. 14 illustrates a fourth example of the time-of-day setting status.

FIG. 14 illustrates a fourth example of the time-of-day setting status. In the illustrated example in FIG. 14, a case is considered where the system boards 110 and 210 are in operation, and then the system board 110 is abnormally stopped. Before the system board 110 is abnormally stopped, the logical domain #0 is arranged in the system board 110, the logical domain #1 is arranged such that it spans the system boards 110 and 210, and the logical domain #2 is arranged in the system board 210.

The TOD difference in the system board 110 $\Delta 0 = Y3$ (time of day on the TOD clock 111)−X3 (time of day on the TOD clock 121), and the TOD difference in the system board 210 $\Delta 1 = Z3$ (time of day on the TOD clock 211)−X3 (time of day on the TOD clock 221) are registered in the TOD difference table 125 held by the service processor 120.

When the system board 110 is abnormally stopped, the hypervisor 411 changes the TOD clock to be assigned to the logical domains #0 and #1 from the TOD clock 111 to the TOD clock 211. The service processor 120 calculates a time-of-day discrepancy between the TOD clock 211 and the TOD clock 111 $\Delta 1 - \Delta 0$ by referring to the TOD difference table 125, and notifies the hypervisor 411 of the calculated time-of-day discrepancy. The hypervisor 411 adds the time-of-day discrepancy $\Delta 1 - \Delta 0$ notified from the service processor 120 to each of the time-of-day offsets for the logical domains #0 and #1. From then on, the hypervisor 411 provides the time of day to the logical domains #0 and #1 using the time of day on the TOD clock 211 and the updated time-of-day offsets.

With the information processing apparatus according to the third embodiment, similarly to the second embodiment, it is possible to effectively distribute the clock access when the logical domains #0 to #3 issue hypervisor calls. Further, even when the TOD clocks assigned to the logical domains #0 to #3 are dynamically changed, it is possible to maintain consistency in the time of day on the logical domains #0 to #3 taking into account the time-of-day discrepancy between the TOD clocks before and after the change of the TOD clocks.

According to the above-described information processing apparatus and time-of-day control method, it is possible to effectively distribute access to the clock device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. An information processing apparatus comprising:
   a control unit including a first clock device for providing a time of day; and
   a plurality of physical domains each including a second clock device for providing a time of day and each configured to be capable of implementing at least one logical domain that functions as a virtual information processing apparatus,
   wherein the control unit controls a first time-of-day difference between the time of day on the second clock device of each physical domain and the time of day on the first clock device,
   wherein each physical domain manages a second time-of-day difference between a time of day on a logical domain implemented on the physical domain and the time of day on the second clock device of the physical domain,
   wherein the time of day on the logical domain implemented on each of the plurality of physical domains is controlled based on the first time-of-day difference and the second time-of-day difference, and
   wherein the control unit generates information on the time of day on the logical domain implemented on each physical domain based on the first time-of-day difference and the second time-of-day difference notified from the physical domain.

2. The information processing apparatus according to claim 1, wherein when any of the physical domains is started up, the control unit sets the time of day on the first clock device as the time of day on the second clock device of the started physical domain, and manages the first time-of-day difference which is produced after setting the time of day.

3. The information processing apparatus according to claim 1, wherein each physical domain holds information indicative of the second time-of-day difference, and
   wherein each physical domain reads out the time of day on the second clock device thereof, and provides the time of day calculated based on the read time of day and the information indicative of the second time-of-day difference to a logical domain implemented on the physical domain.

4. The information processing apparatus according to claim 3, wherein upon detecting that a time-of-day setting command has been issued from a logical domain implemented on each physical domain, the physical domain updates the information indicative of the second time-of-day difference based on the time-of-day setting command.

5. The information processing apparatus according to claim 1, wherein when any of the physical domains is started up, the control unit outputs the information on the time of day on the logical domain to the started physical domain, and
   wherein each physical domain sets an initial value of the second time-of-day difference based on the information on the time of day on the logical domain acquired from the control unit.

6. The information processing apparatus according to claim 1, wherein when any of the logical domains migrates from a first physical domain to a second physical domain, the second physical domain updates a second time-of-day difference of the logical domain according to respective first time-of-day differences of the first and second physical domains managed by the control unit.

7. A method of controlling a time of day for an information processing apparatus including a control unit and a plurality of physical domains, the method comprising:
   implementing at least one logical domain on each physical domain that functions as a virtual information processing apparatus;
   managing a first time-of-day difference between a time of day on a first clock device of the control unit and a time of a second clock device of each physical domain;
   managing, in each physical domain, a second time-of-day difference between a time of day on a logical domain implemented on the physical domain and a time of day on the second clock device of the physical domain;
   controlling the time of day on the logical domain implemented on each of the plurality of physical domains based on the first time-of-day difference and the second time-of-day difference; and
   generating information on the time of day on the logical domain implemented on each physical domain based on the first time-of-day difference and the second time-of-day difference notified from the physical domain.

* * * * *